Jan. 3, 1956 G. A. LYON 2,729,509
WHEEL COVER
Filed Aug. 27, 1952 2 Sheets-Sheet 1
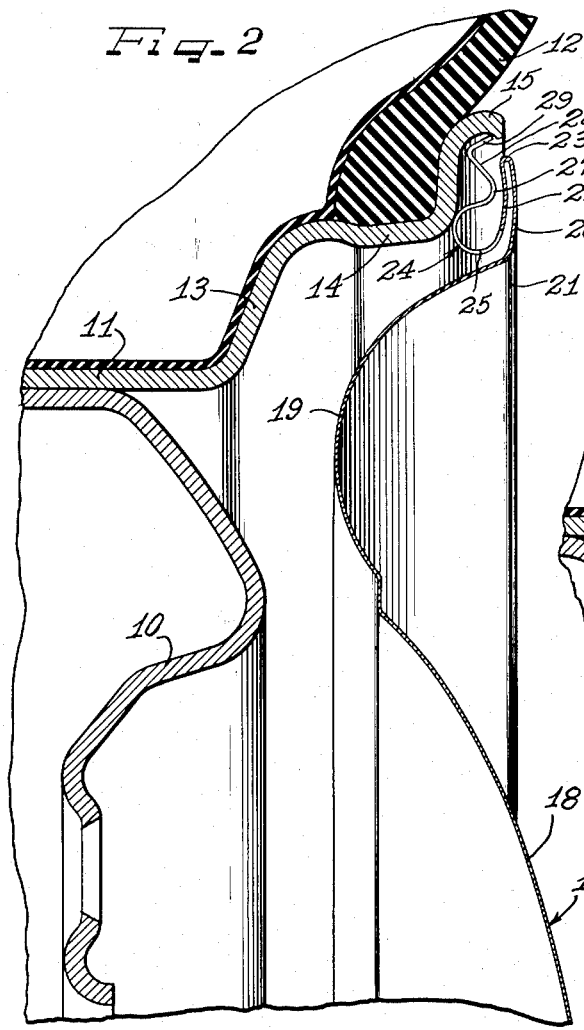
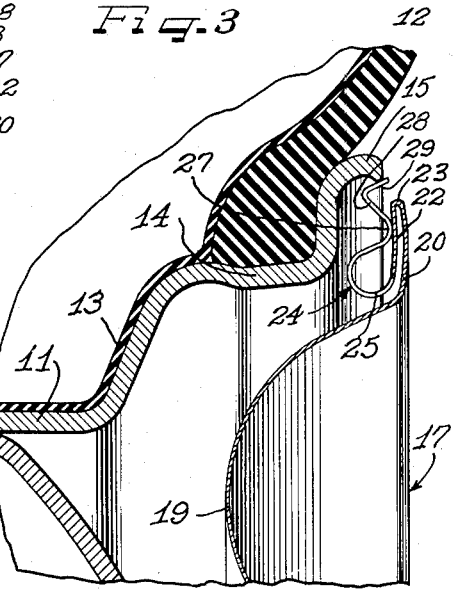
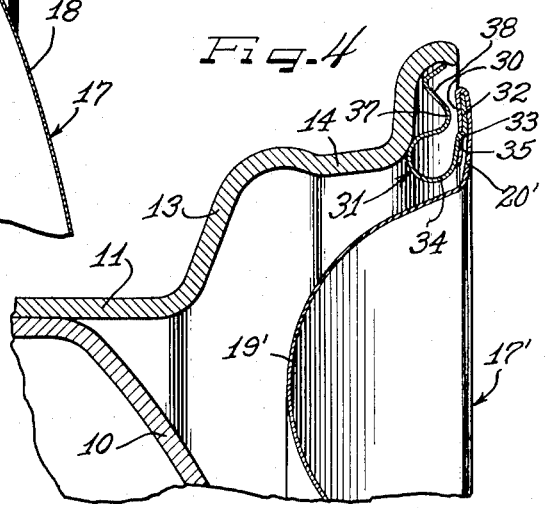
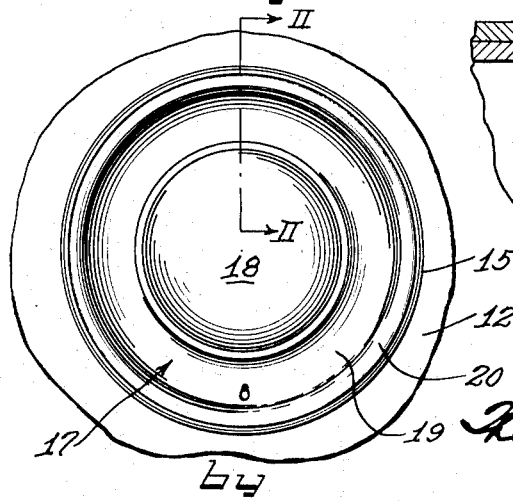
Inventor
GEORGE ALBERT LYON
by *The Firm of Charles W. Lillie*
Attys.

Jan. 3, 1956  G. A. LYON  2,729,509
WHEEL COVER
Filed Aug. 27, 1952  2 Sheets-Sheet 2
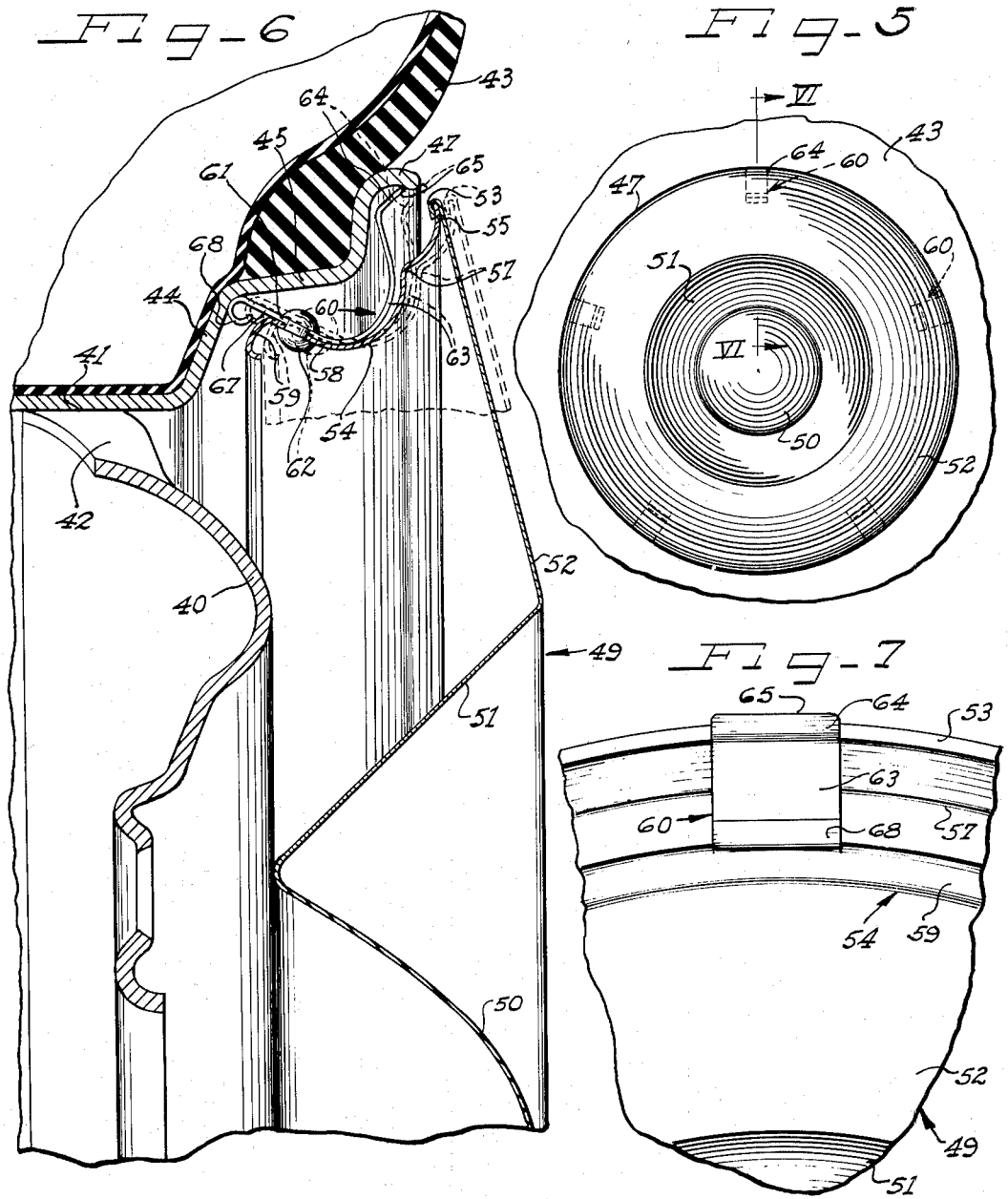
Inventor:
George Albert Lyon
by Hill, Sherman, Meroni, Gross & Simpson
Attys

United States Patent Office 2,729,509
Patented Jan. 3, 1956

2,729,509

WHEEL COVER

George Albert Lyon, Detroit, Mich.

Application August 27, 1952, Serial No. 306,662

18 Claims. (Cl. 301—37)

The present invention relates to improvements in wheel structures and more particularly concerns improved means for protectively and ornamentally covering the outer side of a vehicle wheel.

An important object of the present invention is to provide a wheel structure having improved means protectively and decoratively covering the outer side thereof.

Another object of the invention is to provide an improved cover for disposition at the outer side of the vehicle wheel and having novel means for attaching the same in snap-on pry-off relation to the tire rim of the wheel.

A further object of the invention is to provide a vehicle wheel cover having improved spring clip means for retaining the cover on a wheel by engagement with a flange portion of the wheel.

According to the general features of the present invention there is provided in a wheel structure including a wheel body and a multi-flange tire rim having angularly related respective generally radially and generally axially extending flange portions, a circular wheel cover for disposition at the outer side of the wheel having a portion to overlie the tire rim, said portion carrying therebehind a series of spring retaining clips having edges retainingly engageable under radially and axially inward tension with the axially extending flange portion of the tire rim, and shoulders bottoming under said tension with said radially extending flange portion.

According to other features of the present invention there is provided in a wheel structure including a wheel body and a multi-flange tire rim having a generally arcuately outwardly extending terminal flange, a wheel cover including a circular body member having a marginal portion arranged to overlie the inner portion of the terminal flange and including an underturned flange portion having thereon a series of retaining clips of substantial resiliency each of which includes a retaining finger interengageable with the outwardly projecting portion of the tire rim terminal flange and an intermediate hump flexibly engageable by the underturned flange in pressing the cover into position in order to force the clips past the edge of the terminal flange into retaining position.

According to additional features of the invention there is provided a vehicle wheel cover comprising a circular body having an outer marginal portion arranged to overlie the inner portion of a tire rim terminal flange and including an underturned flange having thereon retaining clips which project generally radially outwardly behind the flange and have retaining portions projecting beyond the edge of the cover and an intermediate generally axially outwardly extending portion directly behind the marginal flange and engageable by the flange upon flexure of the clips in resisting movement into retaining engagement with the outer portion of the terminal flange of the wheel.

According to further features of the invention the clips comprise integral extensions of the inner edge of the underturned flange and are connected to the flange by large resilient loops.

According to still further features of the invention the clips are formed separate from the underturned flange and are assembled therewith.

Other objects, features and advantages of the present invention will be readily apparent from the following detail description of certain preferred embodiments thereof taken in conjunction with the accompanying drawings, in which:

Figure 1 is a side elevational view of a vehicle wheel having a cover embodying the features of the present invention;

Figure 2 is an enlarged radial sectional view taken substantially on the line II—II of Figure 1;

Figure 3 is a radial sectional view similar to Figure 2 but showing the cover in process of being applied;

Figure 4 is a radial sectional view similar to Figure 2 but showing a modified form of the cover;

Figure 5 is a side elevational view of a wheel having a modified cover thereon;

Figure 6 is an enlarged fragmentary radial sectional view taken substantially on the line VI—VI of Figure 5; and Figure 7 is a fragmentary rear elevational view of the cover of Figure 6 showing one of the spring clips.

As shown on the drawings:

A wheel with which the present invention is adapted to be used comprises a wheel body 10 and a tire rim 11 which is preferably of the multi-flanged drop center type adapted to support a pneumatic tire and tube assembly 12. The tire rim has a side flange 13, an intermediate flange 14 and a terminal flange 15 which extends generally radially outwardly and then curves axially outwardly and is of concave cross-section. Between the base flange 11 of the tire rim and the wheel body 10 may be provided the usual air circulation openings.

Covering the outer side of the wheel is a cover 17 which may be of the full disk type and adapted to cover not only the wheel body 10 but substantially all of the tire rim 11, the outer margin of the cover being of a circumference slightly less than the circumference of the inner side of the edge of the outermost portion of the terminal flange 15. An intermediate portion of the cover identified at 19 is of concave cross-section and is generally simulative in a decorative sense of the relatively large outwardly opening juncture groove between the wheel body and the outer side of the tire rim. At its margin the cover has a generally radially extending convex marginal portion 20 formed on a relatively large radius cross-section and joining the intermediate portion 19 on a reinforcing rib 21. The marginal portion 20 is reinforced by an underturned flange 22 which joins the same on a rounded bead-like juncture rib edge 23 defining the periphery of the cover.

Novel means are provided for retaining the cover on the wheel and in the present instance comprising a series of retaining spring fingers or clips 24 which are constructed and arranged to engage retainingly with the inner side of the curved outer portion of the terminal flange 15, and more specifically within the groove defined by such portion of the terminal flange. In a preferred form, the spring clips 24 are formed as integral extensions in one piece from the edge of the underturned flange 22. There may be as many of the clips 24 as desired disposed about the periphery of the cover.

Each of the clips 24 comprises a relatively large juncture loop 25 extending from the edge of the flange 22 and turned generally radially outwardly and merging with a generally axially outwardly extending intermediate hump portion 27 which in turn has the outer side defined by a generally radially outwardly and axially inwardly extending flange 28 terminating in a generally radially and axially outwardly extending angular terminal retaining flange 29. The flange 29 provides a cam surface which, in the application of the cover to the wheel, as seen in Figure 3, engages against the edge of the terminal flange 15 and by reason of the length and resiliency of the clip 24 affords some resistance to inward movement thereof so that the hump 27 is engaged by the underturned flange 22. Upon further inward movement of the cover by pressure applied axially inwardly thereagainst the flange 22 forces the clip 24 inwardly to cause the terminal flange 29 to cam inwardly past the tip of the terminal flange 15 and snap into the groove defined thereby so that the tip of the clip flange 29 engages retainingly against the wall of the groove.

While the cover is being forced inwardly radially inward tensioned yielding of the clips will be noticed and the cover will continue to move inwardly until the loop 25 engages against the shoulder adjacent juncture of the terminal flange with the intermediate flange 14 of the tire rim. At this point the terminal retaining finger flange 29 is in full retaining engagement with the terminal flange 15 of the tire rim and upon release of pressure against the cover, the cover springs outwardly due to the resilience of the loop 25. However, as a result of the radially and axially inward tension the shoulder of the loop 25 of the clips bottoms under the tension against the opposing shoulder of the tire rim.

Inasmuch as the retaining fingers or clips 24 are of substantial resiliency and more especially since the loops 25 thereof are substantially resilient, and the edge 23 is spaced from the terminal flange 15, the cover 17 is supported in substantially radially floating condition so that it is efficiently resistant to radially impose pressure in service. The cover is also resilient or springy in an axial direction due to the springiness of the retaining clips and the fact that the cover is supported by the retaining clips entirely spaced from all parts of the wheel. Therefore, the cover is quite resistant to damage from external pressure imposed thereon for any reason as by curbing during service.

When it is desired to remove the cover, a pry-off tool is inserted between the reinforced edge 23 of the cover and the terminal flange 15 and pry-off leverage applied which causes the spring retaining clips 24 nearest the application of pry-off force to yield and spring or deflect inwardly until the same snap free from the terminal flange 15 and release the cover from the wheel. This is accomplished without any damage to the spring retaining clips and as a result the same assume the initial condition thereof wherein the tips of the retaining flange portions 29 of the clips extend to a somewhat greater diameter than the inside diameter defined within the groove of the terminal flange 15. Consequently, the cover can be mounted and removed from the wheel as and whenever desired.

In the modification of Figure 4, the wheel is the same as the wheel shown in Figure 2 and, therefore, the same reference numerals have been applied. However, in the form of Figure 4 a modified cover 17' is shown including an intermediate concave portion 19' and a marginal portion 20' substantially like the similar portions of the cover 17 of Figure 2, but the marginal portion 20' has an underturned flange 30 which does not have integral retaining spring clips or fingers 31 which are assembled with the flange 30. To this end, each of the retaining spring clip fingers 31 includes a base flange 32 joined by an offsetting bend 33 with a relatively large diameter spring loop 34 and the base flange 32 is inserted through a clearance slot 35 in the flange 30 to engage within the re-entrant mouth defined between the flange 30 and the marginal portion 20' and clamped in such position by the flange 30, the offsetting bend 33 lying within the slot 35. The adjacent portion of the loop 34 lies against the flange 30 at the side of the slot 35 remote from the edge of the cover.

The clip 31 includes, similarly as the clips 24 of Figure 2, an intermediate axially outwardly extending portion or hump 37 which is engageable by the flange 30 upon axial inward flexure against the hump 37 as in applying the cover to the wheel. From the hump 37 extends a generally radially outwardly and axially inwardly angled flange 38 terminating in a retaining finger flange 39 extending generally radially and axially outwardly and engaging at its tip against the inner side of the outwardly projecting portion of the terminal flange 15 for retaining the cover in place. Operation of the retaining spring clip fingers 31 is the same as the retaining spring clip fingers 24.

In addition to the floating resilience afforded for the cover by the retaining spring clip fingers 24 and 31, it will be observed that the wheel will be substantially cushioned by the outwardly projecting humps 27 or 37 of the clips when substantial impacts are imposed axially inwardly against the cover and especially against the margin of the cover.

In the modification of Figures 5 to 7, the wheel comprises a wheel body 40 attached to a tire rim including a base flange 41, with air circulation openings 42 provided between the wheel body and the tire rim. The tire rim is of the multi-flanged, drop center type adapted to support a pneumatic tire and tube assembly 43 and comprises a generally radially outwardly extending side flange 44 merging with a generally axially outwardly and slightly radially tapering intermediate flange 45 extending to a terminal flange 47.

For protectively and ornamentally covering the outer side of the wheel a cover 49 is provided. This cover comprises a central crown portion 50 merging with a divergently related generally axially and radially outwardly obliquely extending intermediate annular cover portion 51. An outer annular marginal cover portion 52 extends generally radially outwardly and obliquely axially inwardly from the intermediate cover portion 51 and is preferably of a radial extent somewhat less than the diameter of the terminal section of the terminal flange 47. An outer edge underturned flange 53 provides a finishing and stiffening, reinforcing edge structure for the cover.

Means for retaining the cover 49 floatingly on the wheel herein comprise an annular substantially rigid retaining flange member 54 disposed behind the marginal portion 52 of the cover. The annular retaining flange ring member 54 has at its outer margin a flange 55 which is generally complementary in angle to and bears against the underside of the outer marginal portion of the cover margin 52 and is clamped in place thereagainst by the underturned flange 53. From the flange 55, the retaining ring member 54 extends generally radially and axially inwardly and comprises a series of annular angularly related concave-convex sections providing a plurality of reinforcing ribs and mutually reinforcingly related flange sections including an axially inwardly directed shoulder rib 57 and an inner obliquely radially outwardly and axially inwardly extending flange portion 58 terminating in a generally radially inwardly extending terminal reinforcing flange 59. In Figure 2, it will be observed that the flange ring is dimensioned to fit in substantial spaced relation about the outer side of the tire rim.

The flange section 58 carries a series of cover-retaining spring finger clips 60. Each of the clips 60 comprises a resilient spring loop having a base flange 61 secured as by means of a rivet 62 to the radially outwardly facing surface of the flange section 58. Merging on a large radius with the clip flange 61 is a resilient loop 63 extending generally axially and radially outwardly behind the shoulder rib 57 and then axially inwardly and terminating in a generally radially and axially outwardly extending short and stiff angularly related terminal finger flange 64 providing a wheel engaging tip 65.

Normally, as seen in dash outline in Figure 6, the terminal clip flange 65 extends to a diameter which is substantially greater than the edge portion of the axially extending extremity section of the terminal flange 47 of the tire rim. Thereby, the cover can initially be substantially centered with respect to the wheel by seating the shoulder or cam face provided by the inner side of the retaining flanges 64 of the spring clips against the edge of the terminal flange 47. Then, by application of axially inward pressure on the cover the terminal retaining flanges 64 are caused to cam both radially and axially inwardly along the tire rim terminal flange edge and the clip loops 63 flex axially outwardly under resilient tension and the intermediate hump portions thereof bear against the shoulder rib 57. This substantially shortens the clip loop lever and as a result, the inward pressure against the cover is applied to the clip loop 63 closer to the retaining flange 64 and the latter is forced cammingly past the terminal flange edge and snaps into the radially inwardly opening groove defined by the outer portion of the terminal flange 47. During this action, the spring loop 63 is flexed radially inwardly and reacts strongly radially outwardly toward the retaining tip or edge 65 which drives retainingly into wedging retaining engagement with the surface of the terminal flange 47. The clip loops 63 then draw inwardly away from the shoulder 57.

By having the base portion 61 of the clips 60 extend generally axially and radially inwardly as a stop finger or leg 67 beyond the inner terminal edge flange 59 of the clip supporting ring member 54, a limit upon inward movement of the cover is defined by engagement of a short radius stiff terminal loop 68 against the side flange 44 of the tire rim. Axially outward angling of the stop fingers 67 to a diameter that effects engagement of the terminal loop 68 with the inner portion of the intermediate flange 45 provides a centering as well as spacing support for the cover.

The width of the flange 54 is such that in the fully assembled relation of the cover with the wheel, the flange inner terminal 59 extends substantially into the juncture groove between the tire rim and the wheel body, but by virtue of the inward stop provided by the spring clip legs 67, the outer edge portion 53 of the cover is held in spaced relation to the tire rim. The support provided by the clips 60 also maintains the body portion of the cover 49 out of engagement with the wheel body. The inner terminal flange 59 is proportioned to remain out of engagement with either the tire rim or the wheel body. Thereby the cover is substantially floatingly but firmly supported.

When the cover 49 is to be removed from the wheel, a pry-off tool is interposed between the reinforced marginal portion of the cover 53 and the adjacent tire rim terminal flange 47, and pry-off force levered axially outwardly against the cover and the retaining flange ring 54. The shoulder 57 can be engaged by the pry-off tool in effecting adequate pry-off leverage. As an incident to the pry-off leverage, the tips 65 of the retaining clips 60 adjacent the point of pry-off are released from the tire rim. After release of the clips from the tire rim, they snap back to the normal, unstressed condition thereof, ready for reapplication of the cover to the wheel.

In both of the forms of the invention shown in Figures 2 and 6, it will be apparent that by having the marginal portions of the respective covers 17 and 49 spaced from the tire rim, air circulation through the space behind the covers is accommodated to assist in cooling a brake drum (not shown) with which the wheel may be associated in service by movement of air through the wheel openings.

The present application is a continuation-in-part of my copending application, Serial No. 135,468, filed December 28, 1949.

It will be understood that modifications and variations may be effected without departing from the scope of the novel concepts of the present invention.

I claim as my invention:

1. In a wheel structure including a wheel body and a multi-flange tire rim having a generally arcuately outwardly extending terminal flange, a wheel cover including a circular body member having a marginal portion arranged to overlie the inner portion of the terminal flange and including an underturned flange portion having thereon a series of retaining clips of substantial resiliency each of which includes a retaining finger interengageable with the outwardly projecting portion of the tire rim terminal flange and an intermediate hump flexibly engageable by the underturned flange in pressing the cover into position in order to force the clips past the edge of the terminal flange into retaining position.

2. A vehicle wheel cover comprising a circular body having an outer marginal portion arranged to overlie the inner portion of a tire rim terminal flange and including an underturned flange having thereon retaining clips which project generally radially outwardly behind the flange and having retaining portions projecting beyond the edge of the cover and an intermediate generally axially outwardly extending portion directly behind the marginal flange and engageable by the flange upon flexure of the clips in resisting movement into retaining engagement with the outer portion of the terminal flange of the wheel.

3. A vehicle wheel cover comprising a circular body having an outer marginal portion arranged to overlie the inner portion of a tire rim terminal flange and including an underturned flange having thereon retaining clips which project generally radially outwardly behind the flange and have retaining portions projecting beyond the edge of the cover and an intermediate generally axially outwardly extending portion directly behind the marginal flange and engageable by the flange upon flexure of the clips in resisting movement into retaining engagement with the outer portion of the terminal flange of the wheel, the clips comprising integral extensions of the inner edge of the underturned flange and being connected to the flange by large resilient loops.

4. A vehicle wheel cover comprising a circular body having an outer marginal portion arranged to overlie the inner portion of a tire rim terminal flange and including an underturned flange having thereon retaining clips which project generally radially outwardly behind the flange and have retaining portions projecting beyond the edge of the cover and an intermediate generally axially outwardly extending portion directly behind the marginal flange and engageable by the flange upon flexure of the clips in resisting movement into retaining engagement with the outer portion of the terminal flange of the wheel, the clips being formed separately from the underturned flange and being assembled therewith.

5. In a vehicle wheel cover including a circular body portion having an outer marginal underturned flange, a plurality of spring clips carried by said flange and including a sinuous body portion extending generally radially outwardly behind said flange and having an intermediate hump normally spaced from said flange but engageable by the flange upon relative axial movement of the margin of the cover and the clip to limit such relative axial movement.

6. In a cover for disposition at the outer side of a vehicle wheel having a multi-flange tire rim including a terminal flange, a circular cover member having an underturned marginal portion adapted to lie opposite the terminal flange and including a plurality of retaining spring clips therebehind and extending generally radially outwardly and having retaining clips of normally greater diametrical extent than the diameter defined by the inside surface of the terminal flange of the tire rim, each of said clips having a relatively large loop portion serving as a limit stop to rest against the inner portion of the terminal flange and also having a generally radially outwardly extending intermediate portion engageable upon flexure of the clips by the underturned flange to limit relative axial movement of the clips and the underturned flange.

7. In a vehicle wheel cover, a body member having a margin including an underturned flange, said flange having a series of retaining clips extending from the edge thereof and each of said clips including a relatively large radially inwardly and axially inwardly and radially and axially outwardly turned loop, and an intermediate hump, said hump merging with a generally radially outwardly and axially inwardly angled flange, said angled flange having a generally radially and axially outwardly angled retaining finger normally projecting substantially beyond the edge of the cover and adapted to engage with the outturned portion of a terminal flange of a vehicle wheel, said hump being engageable with the underturned flange to limit relative axial movement of the clips and the underturned flange upon flexure of said loop.

8. In a vehicle wheel cover, a cover body having a margin including an underturned marginal flange, said marginal flange having a slot therein, and a retaining clip having a base portion extending through said slot and clamped between the cover margin and said flange, said clip having a resilient loop portion and a retaining tip portion, with a hump extending generally axially outwardly between said loop and said tip for engagement with the underturned flange upon flexure of the clip for relative axial movement of the clip and cover margin whereby to limit such relative axial movement.

9. In a wheel structure including wheel body and rim parts, a cover for the outer side of the wheel having a margin disposed adjacent to a generally radially facing portion of one of said wheel parts, said margin having a set of retaining clips therebehind for engagement with said portion, said cover being entirely spaced from all parts of the wheel except for said clips and said clips supporting the cover in substantially universal floating condition and having respective portions normally spaced from the inner side of the cover margin but engageable therewith as clip-flexure limiting stops upon axially inward movement of the cover margin.

10. In a cover for disposition at the outer side of a vehicle wheel, a circular cover body having a margin for disposition adjacent to a wheel portion to which the cover is to be secured, and a series of retaining clips on said margin each including a resiliently flexible loop portion attached to the margin and a cover retaining portion disposed in a generally radial direction beside said loop portion and having a generally axially outwardly and radially extending terminal flange provided with a generally axially inwardly facing cam surface and an engagement terminal part for retaining engagement by said terminal part with said portion of the wheel after camming of said surface past said wheel portion in the application of the cover to the wheel, said retaining portion having a shoulder hump spaced from said terminal flange and normally in spaced relation behind the margin but engageable as a clip flexure limiting stop with the margin.

11. In a wheel structure including a body part and a rim having angularly related respectively generally radially and generally axially extending flange portions, a circular wheel cover having a portion arranged to overlie the tire rim, said portion carrying therebehind a series of spring retaining clips having terminal portions retainingly engageable under radially and axially inward tension with the axially extending flange portion of the tire rim and shoulders bottoming under said tension against said radially extending flange portion with resilient loop portions intervening between said terminal portions and said shoulders.

12. A wheel structure as defined in claim 11, wherein the angularly related tire rim flange portions comprise parts of the terminal flange of the tire rim and the clips are carried by an underturned flange on the rim-overlying portion of the cover.

13. A wheel structure as defined in claim 11 wherein the angularly related tire rim flanges comprise a base flange and a terminal flange, and the clips carried by the wheel cover are supported by a ring flange extension member attached to said overlying portion of the cover.

14. A cover for disposition at the outer side of a vehicle wheel, a margin on the cover adapted to lie opposite a tire rim, said cover margin having a retaining ring thereon, said ring having thereon a series of retaining spring clips with radially outwardly projecting retaining terminals and intermediate axially outwardly projecting loops affording shoulders for separable engagement with a part of said ring.

15. A cover for disposition at the outer side of a vehicle wheel, a margin on the cover adapted to lie opposite a tire rim, said cover margin having a retaining flange therebehind, said flange having thereon a series of retaining spring clips with radially outwardly projecting retaining terminals and intermediate axially outwardly projecting loops affording shoulders, said flange having a shoulder opposing said clip shoulders.

16. In combination in a wheel cover for disposition at the outer side of a vehicle wheel, a cover body, said body having a marginal portion, an underturned flange on said marginal portion, and a plurality of generally S-shaped clips having base portions interconnected with said underturned flange and engageable with a part of a vehicle wheel to retain the cover in snap-on, pry-off relation.

17. In a cover for disposition at the outer side of a vehicle wheel having a tire rim with axially facing and radially inwardly facing respective annular flanges, a cover body having behind an outer tire rim covering marginal portion thereof a generally inwardly directed annular flange, and a plurality of cover retaining and supporting clips attached to said flange and having elongated body portions provided with opposite terminal legs, certain of the legs of the clips being engageable with the radially facing tire rim flange for retaining the cover against displacement axially outwardly from the wheel, and the remaining legs of the clips being engageable with the axially facing flange of the tire rim for determining axially inwardly disposition of the cover on the wheel.

18. In a wheel structure including a tire rim having generally axially outwardly and generally radially inwardly facing respective flanges, a cover for disposition at the outer side of the wheel having an outer marginal portion thereof for overlying the tire rim and carrying therebehind an inwardly directed annular flange, and a circumferentially spaced series of cover retaining and position locating elongated clips having opposite terminal end portions, certain of the terminal end portions of the clips being retainingly engageable with the radially inwardly facing flange of the tire rim for retaining the cover against displacement axially outwardly from the wheel, and the remaining clip terminal portions being engageable with the axially facing flange of the tire rim for maintaining the axially inward position of the cover relative to the wheel.

References Cited in the file of this patent

UNITED STATES PATENTS

| Re. 19,467 | Lyon | Feb. 12, 1935 |
| 2,394,958 | Wood | Feb. 12, 1946 |
| 2,404,390 | Lyon | July 23, 1946 |
| 2,526,026 | Horn | Oct. 17, 1950 |